(12) United States Patent
Vasseur et al.

(10) Patent No.: US 10,003,473 B2
(45) Date of Patent: *Jun. 19, 2018

(54) PROBING AVAILABLE BANDWIDTH ALONG A NETWORK PATH

(71) Applicant: Cisco Technology, Inc., San Jose, CA (US)

(72) Inventors: Jean-Philippe Vasseur, Saint Martin D'uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/712,906

(22) Filed: Sep. 22, 2017

(65) Prior Publication Data

US 2018/0013587 A1  Jan. 11, 2018

Related U.S. Application Data

(63) Continuation of application No. 14/276,310, filed on May 13, 2014, now Pat. No. 9,813,259.

(51) Int. Cl.
*H04L 12/26* (2006.01)
*H04L 12/46* (2006.01)
*H04L 12/801* (2013.01)

(52) U.S. Cl.
CPC ...... *H04L 12/4641* (2013.01); *H04L 43/0882* (2013.01); *H04L 43/10* (2013.01); *H04L 47/115* (2013.01)

(58) Field of Classification Search
CPC ............... H04L 12/4641; H04L 43/062; H04L 43/0882; H04L 43/10

(Continued)

(56) References Cited

U.S. PATENT DOCUMENTS 6,292,832 B1 * 9/2001 Shah .................. H04L 29/06
                                                   709/223
6,810,356 B1 * 10/2004 Garcia-Franco ...... H04L 41/142
                                                   379/133

(Continued)

FOREIGN PATENT DOCUMENTS

EP   2482493 A1   8/2012
EP   2728828 A1   5/2014
WO   2002080417 A1  10/2002

OTHER PUBLICATIONS

Sajassi et al., "BGP MPLS Based Ethernet VPN", Network Working Group, Internet Draft, draft-ieft-l2vpn-evpn-07, 50 pages, May 2014, Internet Engineering Task Force Trust.

*Primary Examiner* — Khaled Kassim
*Assistant Examiner* — Berhanu Belete
(74) *Attorney, Agent, or Firm* — Parker Ibrahim & Berg LLC; James M. Behmke; Stephen D. LeBarron

(57) ABSTRACT

In one embodiment, a time period is identified in which probe packets are to be sent along a path in a network based on predicted user traffic along the path. The probe packets are then sent during the identified time period along the path. Conditions of the network path are monitored during the time period. The rate at which the packets are sent during the time period is dynamically adjusted based on the monitored conditions. Results of the monitored conditions are collected, to determine an available bandwidth limit along the path.

17 Claims, 8 Drawing Sheets

(58) Field of Classification Search
USPC .................................................. 370/230, 252
See application file for complete search history.

(56) References Cited

U.S. PATENT DOCUMENTS

| | | | | |
|---|---|---|---|---|
| 7,561,517 | B2* | 7/2009 | Klinker | H04L 29/06 370/229 |
| 7,668,946 | B1 | 2/2010 | Garcia-Franco et al. | |
| 7,675,861 | B2* | 3/2010 | Metzger | H04L 45/04 370/241 |
| 7,813,870 | B2 | 10/2010 | Downs et al. | |
| 7,969,878 | B2* | 6/2011 | Fawaz | H04L 47/10 370/230.1 |
| 8,072,901 | B1* | 12/2011 | Blair | H04L 45/00 370/254 |
| 8,189,482 | B2 | 5/2012 | Vasseur et al. | |
| 8,670,326 | B1 | 3/2014 | Balasubramanian et al. | |
| 8,954,567 | B1* | 2/2015 | Skvortsov | H04N 21/24 709/224 |
| 2002/0105911 | A1* | 8/2002 | Pruthi | H04L 41/22 370/241 |
| 2003/0204619 | A1 | 10/2003 | Bays | |
| 2006/0182034 | A1 | 8/2006 | Klinker et al. | |
| 2006/0215577 | A1* | 9/2006 | Guichard | H04L 41/12 370/254 |
| 2006/0239199 | A1* | 10/2006 | Blair | H04L 45/04 370/248 |
| 2006/0239201 | A1 | 10/2006 | Metzger et al. | |
| 2007/0078958 | A1 | 4/2007 | Bennett | |
| 2007/0253332 | A1 | 11/2007 | Fawaz et al. | |
| 2007/0253412 | A1 | 11/2007 | Batteram et al. | |
| 2008/0225713 | A1 | 9/2008 | Tychon et al. | |
| 2009/0209349 | A1* | 8/2009 | Padhye | H04L 67/101 463/42 |
| 2011/0264511 | A1* | 10/2011 | Zhang | G06Q 30/02 705/14.43 |
| 2013/0136002 | A1 | 5/2013 | Song et al. | |
| 2014/0022928 | A1* | 1/2014 | Zingale | H04L 41/145 370/252 |
| 2014/0279136 | A1 | 9/2014 | Pacella et al. | |

* cited by examiner

PROBING AVAILABLE BANDWIDTH ALONG A NETWORK PATH

RELATED APPLICATION

The present application is a Continuation Application of U.S. patent application Ser. No. 14/276,310, filed May 13, 2014, entitled PROBING AVAILABLE BANDWIDTH ALONG A NETWORK PATH, by Jean-Philippe Vasseur et al., the contents of which is hereby incorporated by reference.

TECHNICAL FIELD

The present disclosure relates generally to computer networks, and, more particularly, to probing available bandwidth along a network path.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a time period is identified in which probe packets are to be sent along a path in a network based on predicted user traffic along the path. The probe packets are then sent during the identified time period along the path. Conditions of the network path are monitored during the time period. The rate at which the packets are sent during the time period is dynamically adjusted based on the monitored conditions. Results of the monitored conditions are collected, to determine an available bandwidth limit along the path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
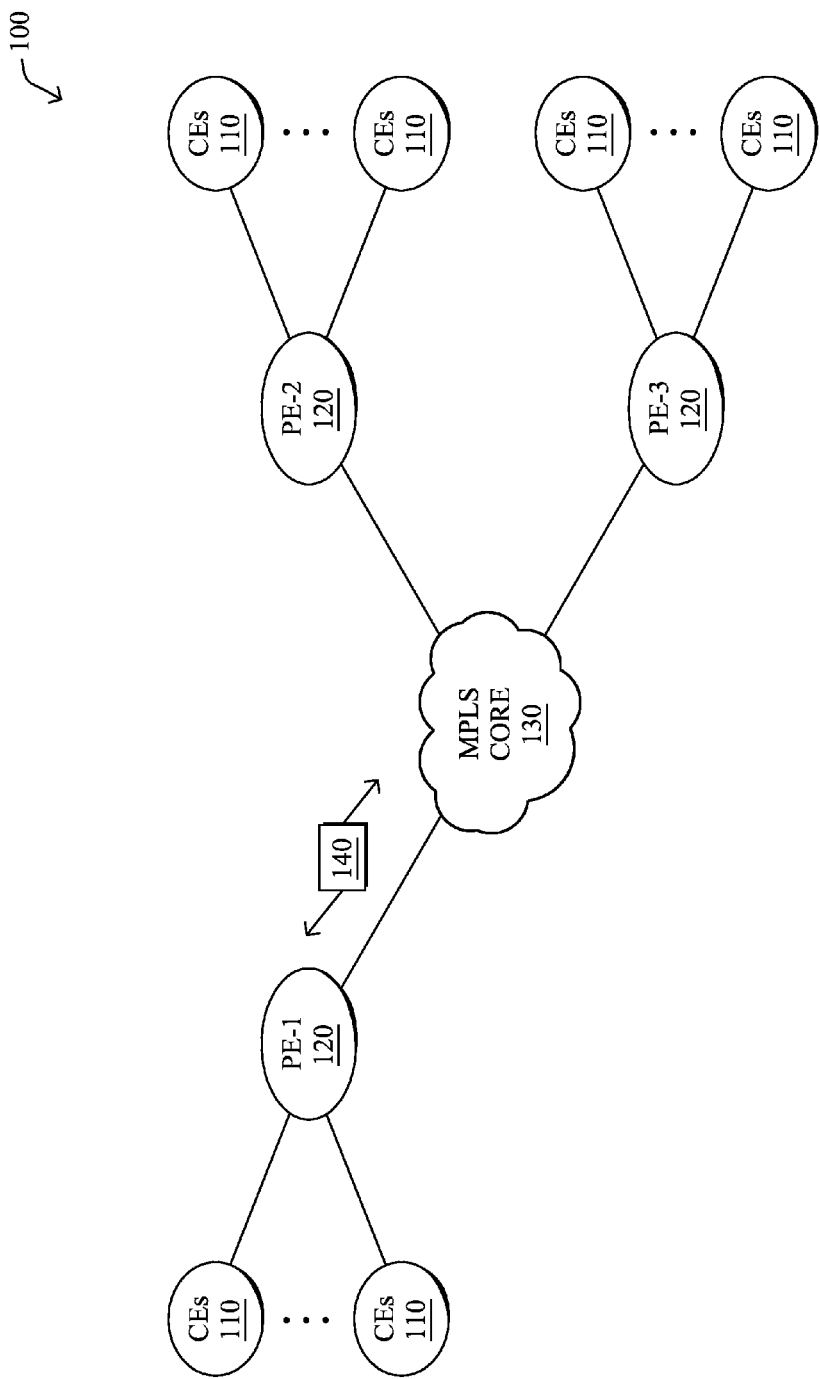
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
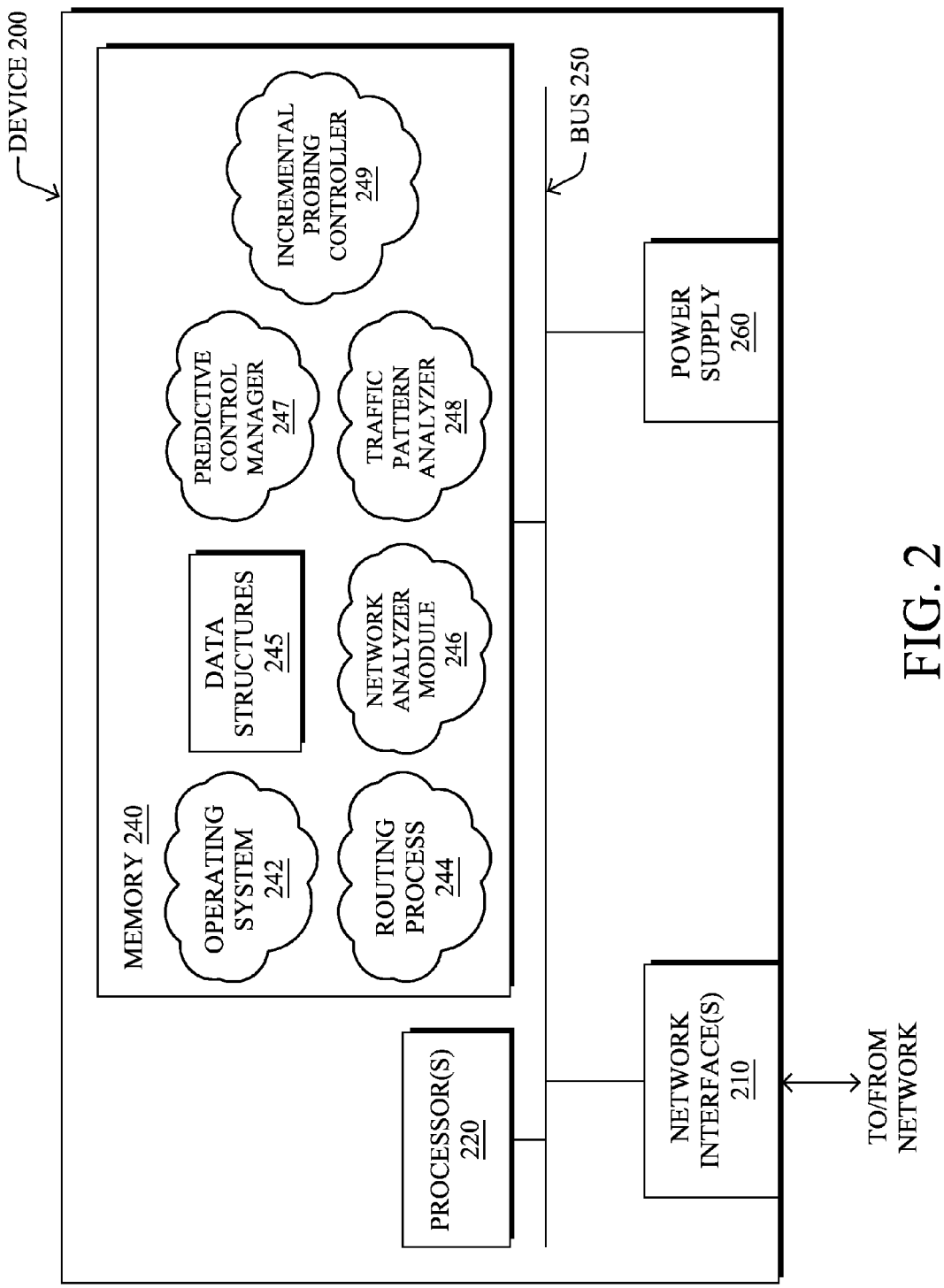
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CEs 110, a network controller (e.g., a device associated with a network operations center (NOC)), or any other computing device that supports the operations of network 100 (e.g., switches, etc.). Device 200 comprises a plurality of network interfaces 210, one or more processors 220, and a memory 240 interconnected by a system bus 250 and powered by a power supply 260. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may comprise routing process 244 (e.g., routing services) and illustratively, a network analyzer module (NAM) 246, a predictive control manager (PCM) 247, a traffic pattern analyzer (TPA) 248, and/or an incremental probing controller 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduces a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performances in terms of connectivity and bandwidth.

According to various embodiments described herein, a dynamic, predictive performance architecture is disclosed that may be implemented in a network, such as a multi-service, multi-carrier WAN. In particular, NAM 246, PCM 247, TPA 248, and/or probing controller 249 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. Incremental probing controller 249 may operate to determine network characteristics, such as those used by NAM 246, by sending probing traffic along a given network path. In various implementations, processes 244 and 246-249 may be co-located or may be distributed across different network devices. Further, while certain functions are described herein with respect to a particular one of processes 244, 246-249, the functions may be incorporated into any of the other processes, in various other embodiments.

Figure 3:
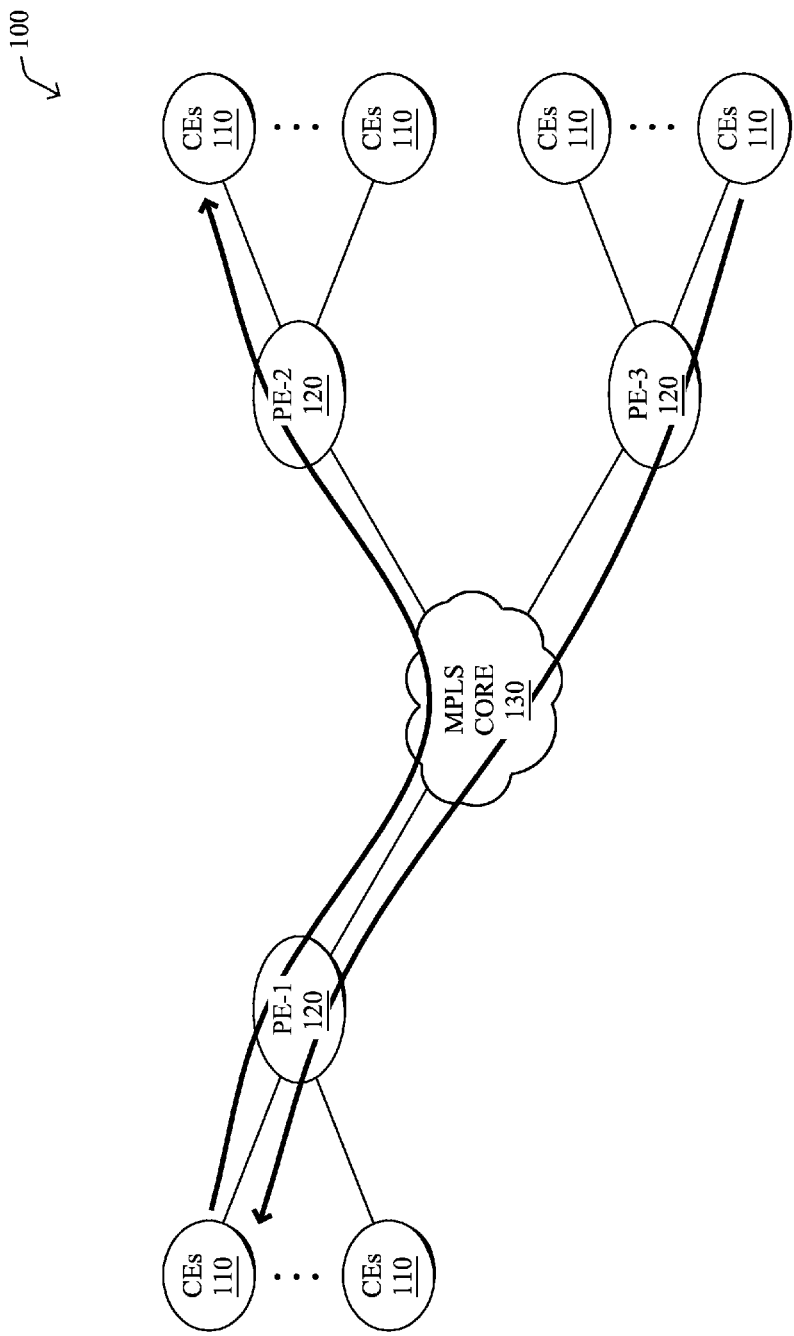
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

According to various embodiments, a predictive performance methodology for WANs and other forms of networks is introduced that that allows for its use across varying network architectures, application requirements, and deployment strategies, as well as in the presence of dynamic traffic and network performances. As detailed below, such an architecture may make use of machine learning techniques, in some embodiments, to evaluate future network requirements and performance, and to take corrective measures within the network to ensure the SLAs are met.

Figure 4A:
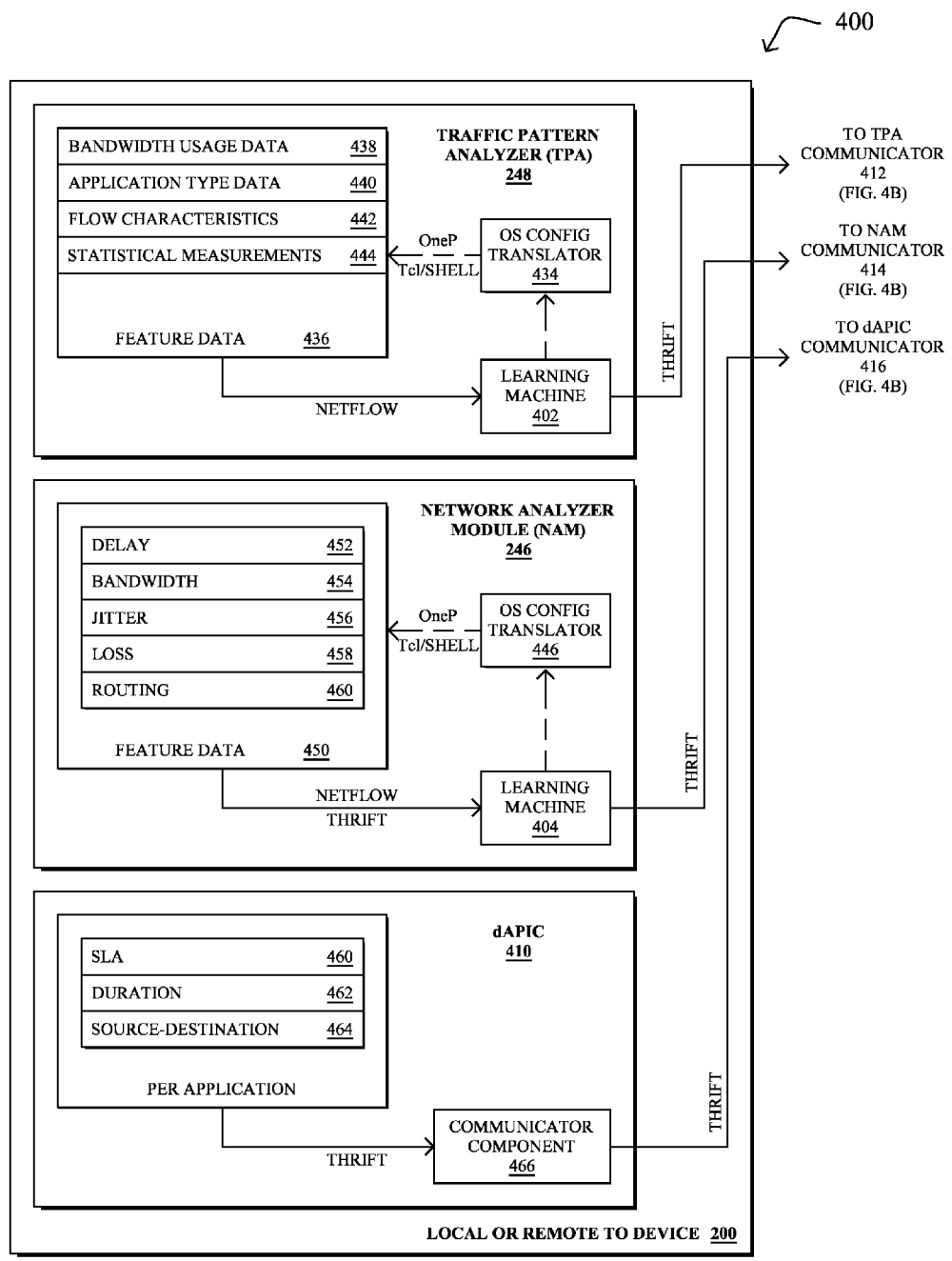
FIGS. 4A-4B illustrate an example architecture for predictive networking.
Figure 4B:
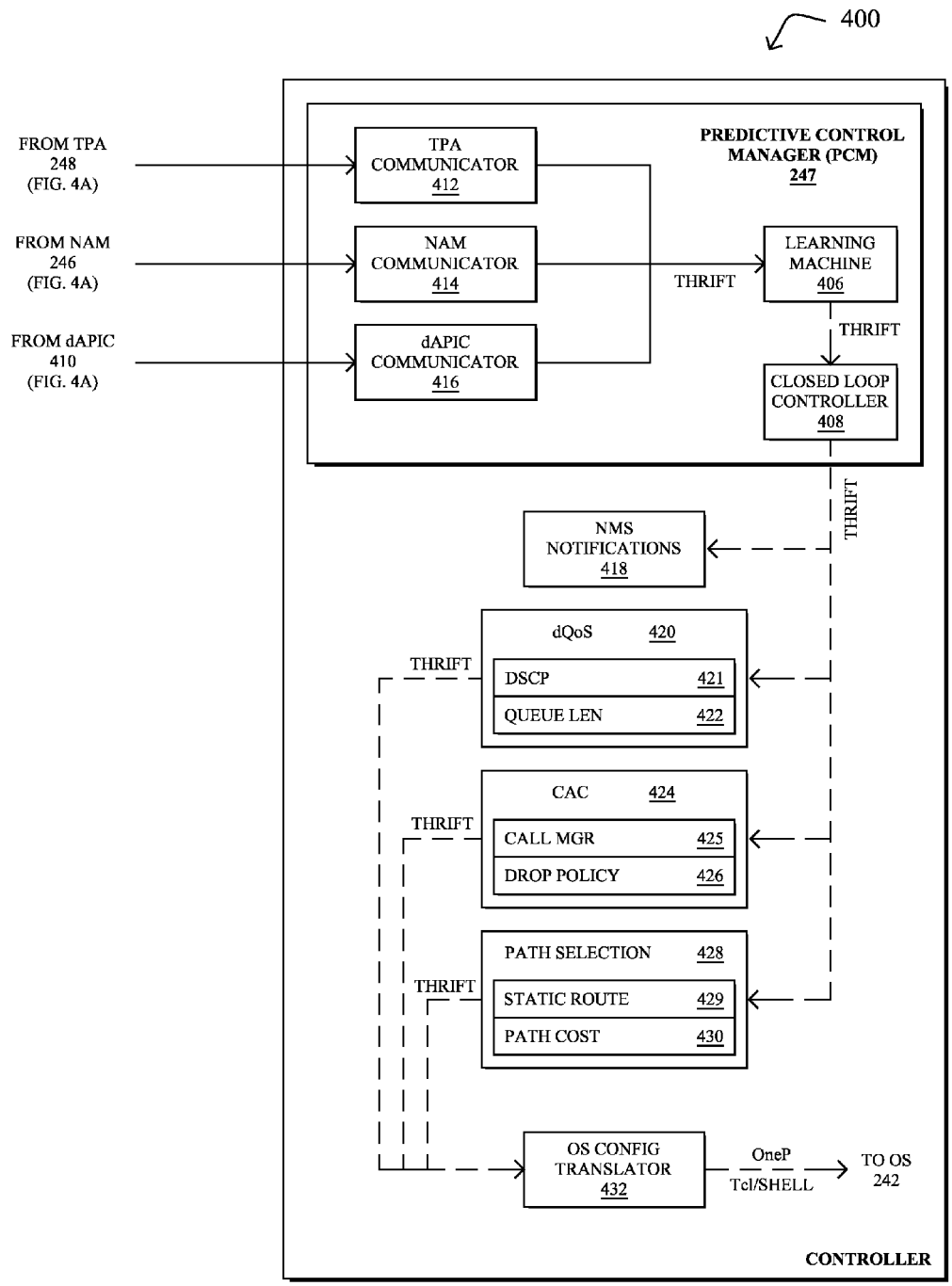

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processes for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following sources: (1) SLA processes may yield data about the delay, jitter and packet loss, which can, in some circumstances, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processes can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 460 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 460-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 460), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As noted above, network characteristics such as bandwidth availability along a given network path may be used to make network adjustments based on predicted network and traffic behaviors. In particular, NAM 247 may use information regarding the available bandwidth along a given path to model the characteristics of the network. However, the available bandwidth within a network may be difficult to determine. For example, one of the biggest challenges in deploying public Internet services from an Internet service provider (ISP) to carry WAN traffic is the lack of ability to determine the bandwidth availability in the core network of the ISP. As the availability of bandwidth in the core of the public Internet varies significantly over time and such bandwidth is not guaranteed, it becomes very difficult to deploy new application services deterministically. Note also that such an issue also applies to SLA-based connectivity such as MPLS VPN. Indeed, although SLAs are supposedly guaranteed, overbooking still applies in these networks, thus requiring mechanisms to determine the actual network resource available.

Probing Available Bandwidth

The techniques herein make use of active probing, to determine point estimates of the available bandwidth along a given path in a network. In some aspects, extra traffic may be sent along a path at a dynamically adjusted rate r using a close loop control mechanism that takes into account the queue states, packet drops, and other network performance metric (e.g., application response time metrics), to avoid impacting the user traffic SLAs. Furthermore, predictive traffic patterns computed by an analytic engine (e.g., TPA 248) may be used as a safe guard mechanism, to schedule when extra traffic should be sent, thereby avoiding sending probing traffic when user traffic very sensitive to delays/jitter is predicted to be present. Note that although the rate is dynamically adjusted, the close loop control mechanism to control r may be reactive. Such a safe guard approach taking advantage of traffic prediction may also be used to further adjust the probing rate to be more conservative, if necessary.

Specifically, according to one or more embodiments of the disclosure as described in detail below, a time period is identified in which probe packets are to be sent along a path in a network based on predicted user traffic along the path. The probe packets are then sent during the identified time period along the path. Conditions of the network path are also monitored during the time period. The rate at which the packets are sent during the time period is also dynamically adjusted based on the monitored conditions. Results of the path conditions monitored during the time period are also collected, to determine an available bandwidth limit along the path.

Illustratively, the techniques described herein may be performed by hardware, software, and/or firmware, such as in accordance with processes 244, 246-249, which may contain computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Figure 5:
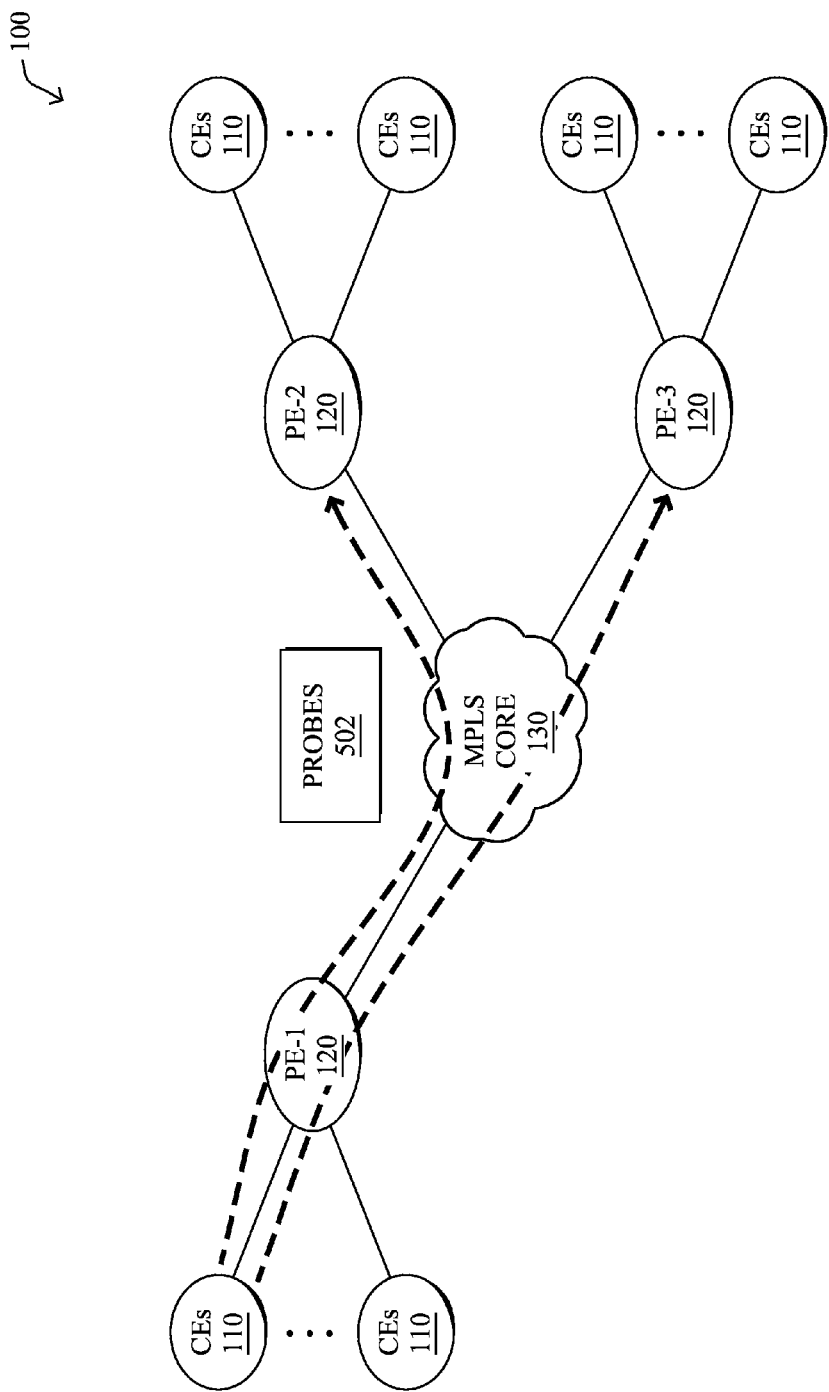
FIG. 5 illustrates an example of bandwidth probes being sent.

Operationally, the techniques described herein may be implemented as part of a predictive networking architecture, such as architecture 400 illustrated in FIGS. 4A-4B. For example, the timing of probe packets to determine available bandwidth may be based in part on predicted traffic patterns, such as those predicted by TPA 248. In addition, the probing rate may be adjusted dynamically thanks to actively monitoring queue states and packet drops, so as not to impact the user traffic. For example, as shown in FIG. 5, a particular CE router 110 (or another device in network 100) may send probe packets along any number of network paths, to determine the characteristics of the paths. In response, a device that receives the probe packets may record and report on how the probe packets performed (e.g., by reporting on the amount of jitter and delays experienced by the probe, etc.).

In various embodiments, incremental probing controller (IPC) 249 may coordinate how and when probe packets are sent, to determine the characteristics of a given network path or link. In various embodiments, IPC 249 may send probing traffic during a selected time period T at a dynamically adjusted rate r. Such traffic probes may, for example, be "colored" (e.g., marked using included data) according to their associated SLAs/application types. For example, a traffic probe for a particular VoIP application (and associated SLA) may be colored one way and a traffic probe for a video conferencing application (and associated SLA) may be colored a different way.

Based on the probing packets that are sent by IPC 249, numerous attributes of the network can be determined. In the case of determining bandwidth, for example, a large burst of User Datagram Protocol (UDP) packets may be sent periodically and the responding device may track jitter and delay changes as the burst size continues to increase. To minimize or eliminate the impact of the probing on user traffic, IPC 249 may dynamically adjust the rate r at which probes are sent along a specific network path, according to various embodiments.

IPC 249 may adjust the rate at which probes are sent in a number of different ways. In one embodiment, r can be determined by periodically tracking the difference in the volume of the traffic egressing or ingressing the branch and the bandwidth capacity that has been leased from the provider and in light of the instantaneous level of congestion of the given link and/or traffic class. In another embodiment, the rate r may be incrementally increased, regardless of the committed SLA (if any), while still taking into account the level of congestion of the given link and/or traffic class. To that end, any or all of the following network metrics may be tracked:

*Jitter and delays: In some implementations, increasing amounts of jitter and delays may indicate that available bandwidth limits are being reached along a network path. For example the device that receives a probe may track these metrics, to determine when a bandwidth limit has been reached.

*Queue states: In order to detect delays due to probing traffic, the queue states of the devices along the path may be tracked.

*Other metrics: Various other metrics may also be tracked regarding the path, such as Application Response Time (ART) metrics.

*User Traffic Metrics & Parameters: To ensure that user traffic is protected during the probing procedure, traffic metrics and/or parameters related to the user traffic may be tracked. For example, if the average queue length increases to a point where the additional delay impacts the SLA for a set of user traffic carried out in that queue, the probing rate may be immediately adjusted, accordingly.

According to various embodiments, IPC 249 may adjust the rate r at which probes are sent, in response to detecting signs of network congestion or increased response times. In another embodiment, IPC 249 may adjust the probing rate r in response to detecting retransmissions along the path (e.g., at the TCP layers), to avoid any impact on the SLAs of the user traffic. Notably, retransmissions may be indicative of increased delays or packet drops attributable to a lack of available bandwidth. In some embodiments, IPC 249 may also adjust the type of probe that is sent. In particular, IPC 249 may control the size of a probe, the class of traffic assigned to the probe, or other such characteristics of the probe.

IPC 249 may determine the available bandwidth limits for the probed path(s) based on the observations regarding the probe packets. For example, the bandwidth limit can be computed by IPC 249 based on the rate and size of the probe packets that are sent. In one embodiment, IPC 249 may perform the probing/rate computations over a plurality of time periods during each of which IPC 249 begins by sending a conservative packet bust. In this way, multiple bandwidth estimates may be calculated by IPC 249 and a statistical average may be determined to represent the available bandwidth.

In some embodiments, available bandwidth estimates determined by IPC 249 may be used to perform predictive networking. For example, IPC 249 may provide point estimates for the available bandwidth along a path to NAM 246 (e.g., via an IPv6 message). In turn, the learning machine 404 of NAM 246 may use the available bandwidth estimates (e.g., as part of bandwidth data 454 in feature data 450), to model the characteristics of the network.

Figure 6A:
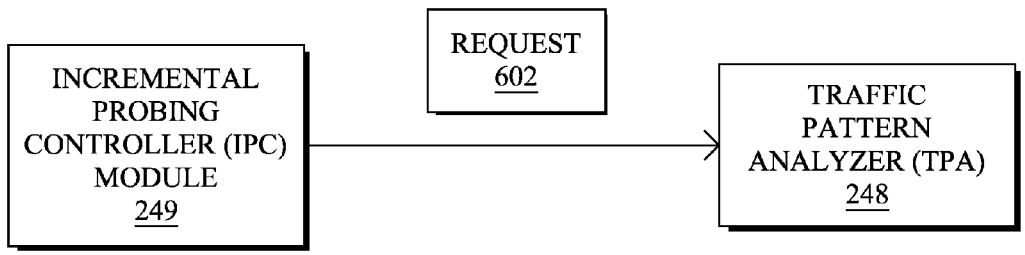
FIGS. 6A-6C illustrate an example of bandwidth probing being coordinated.
Figure 6B:
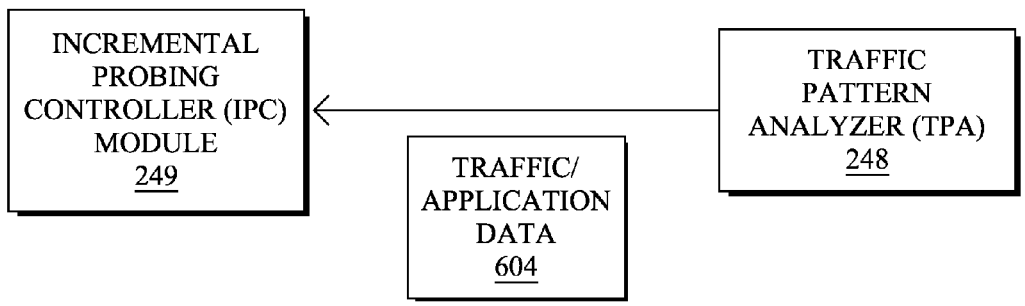
Figure 6C:
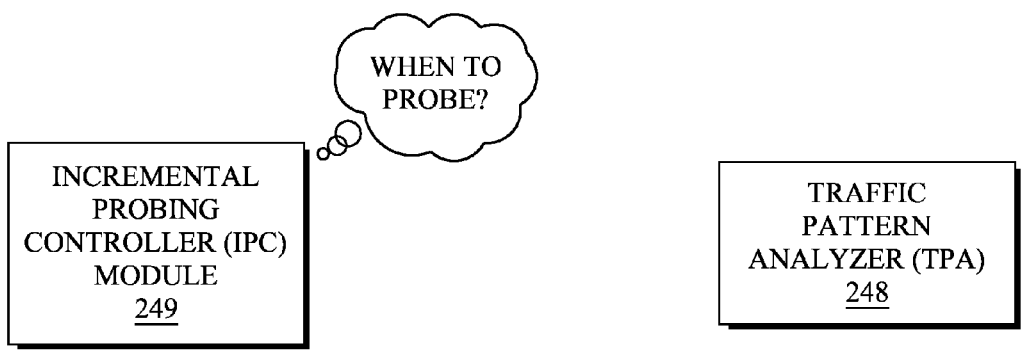

Referring now to FIGS. 6A-6C, an example is shown of IPC 249 determining when and how to perform probing. As shown, IPC 249 may interact with TPA 248 to determine when probing should be performed. In some cases, the dynamic adjustment of the probing rate r may allow probes to be sent at any time without affecting user traffic. However, there may still be some points in time when probing should not be performed, such as when the user traffic is highly sensitive to delays.

As shown in FIGS. 6A-6B, IPC 249 may send a request message 602 to TPA 248 to request information regarding the user traffic in the network (e.g., as an IPv6 unicast message). In response, TPA 248 may return data 604 to IPC 249 which includes information regarding the predicted traffic patterns. For example, data 604 from TPA 248 may include any or all of the following information:

*Traffic Volume Information—In some cases, data 604 sent from TPA 248 to IPC 249 may include the traffic volume profile, potentially on a per application basis. IPC 249 may use this information, for example, to identify time periods during which traffic volume is peaking, time periods during which the traffic volume is minimal, or time periods during which there is a transition from a high volume of traffic to a low volume of traffic (or vice-versa).

2) Critical/Sensitive Application Traffic Information— Data 604 may further indicate when traffic for the most critical or sensitive applications occurs or is likely to occur.

As shown in FIG. 6C, IPC 249 may use data 604 to identify specific points in time during which probing may take place, while also taking into account the predicted traffic patterns from TPA 248 on a on a per-application basis. In other words, IPC 249 may identify a time period during which probe packets may be sent along a particular network path. For the sake of illustration, suppose that two paths P1 and P2 (e.g., via two Internet connections) exist from a branch office B to a Data Center and that the techniques herein are used to estimate the available bandwidth between the two locations. Once IPC 249 retrieves the predicted traffic along these paths from TPA 248 (and potentially on a per application basis), IPC 249 may then determine whether and/or when delay-sensitive user traffic is predicted to occur, and correlates this traffic with the predictive delays along the path (e.g., path P1). For example, if user traffic that is highly sensitive to delays is predicted in the next five minutes along the current path P1 and a risk of impacting the user traffic is still possible even with an adaptive probing rate r, then IPC 249 may take corrective measures. In one case, IPC 249 may defer the probing until a time period in which the delay-sensitive traffic is not predicted to be present. Alternatively, IPC 249 may instead take a more conservative approach to adjusting the probing rate r than normal, to probe concurrently with the user traffic (e.g., by using a low probing rate initially and incrementing the rate by very low amounts).

Figure 7:
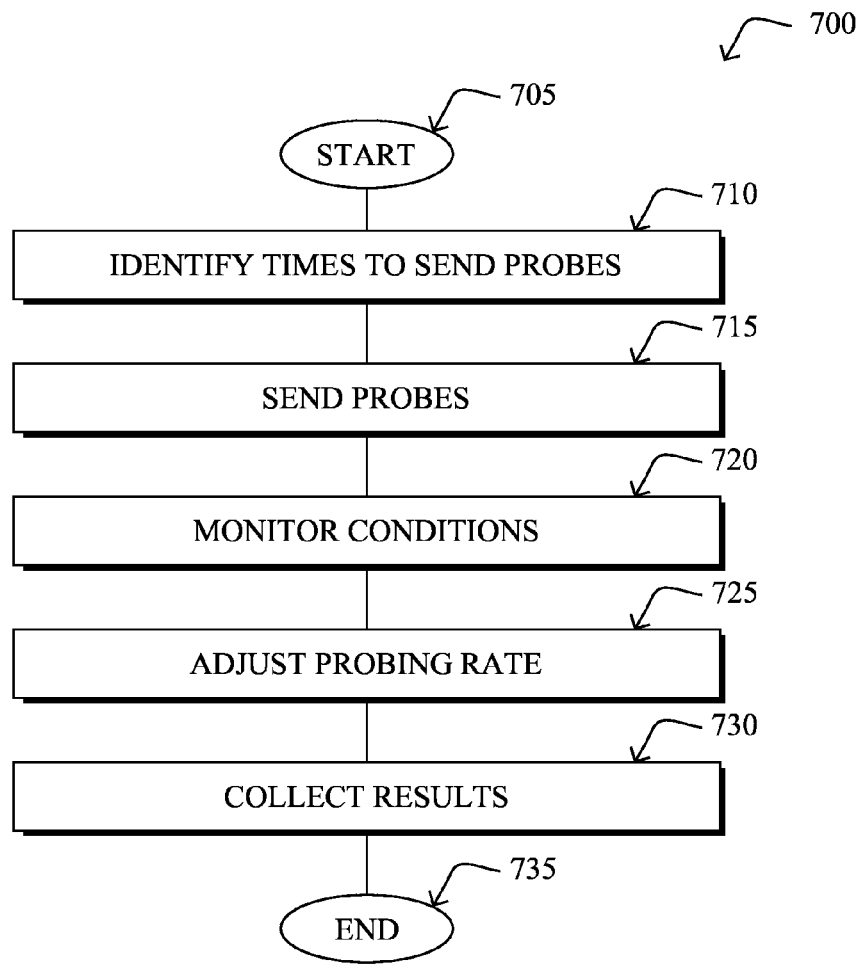
FIG. 7 illustrates an example simplified procedure for performing bandwidth probing.

FIG. 7 illustrates an example simplified procedure for performing available bandwidth probing in a network, in accordance with one or more embodiments described herein. The procedure 700 may start at step 705, and continues to step 710, where, as described in greater detail above, one or more time periods are identified during which probing packets may be sent along a network path. In various embodiments, such a time period may be identified based on one or more traffic volume profiles associated with particular application types, such as those generated by a learning machine. In other words, a probing window may be identified based on traffic predictions made by a learning machine for the different types of user traffic that may be sent through the network. For example, a time-sensitive window may be identified during which time-sensitive traffic is predicted to be present in the network. In some cases, the time period in which the probe packets are to be sent may be selected to specifically avoid the time-sensitive window, thereby avoiding any conflicts with the time-sensitive user traffic.

At step 715, probe packets are sent along the path during a time period identified in step 710, as highlighted above. For example, UDP packets may be sent at the beginning of the identified time period. The device receiving the probe packets may then record metrics regarding the receipt of the probes, such as the amount of jitter and delay experienced by the probes.

At step 720, network conditions are monitored during the probing time period, as described in greater detail above. For example, the monitored conditions may include one or more of: a measured amount of jitter associated with the path, a measured amount of delay associated with the path, a queue state of a device along the path, or an application response time metric. In a further example, the monitored conditions may indicate the presence of traffic congestion along the path and/or a particular communication link in the path. The traffic congestion may also be associated with a particular application type (e.g., the detected congestion may be associated with a particular class of user traffic).

At step 725, as described in greater detail above, the probing rate at which probe packets are sent may be adjusted during the probing time period identified in step 710. For example, the rate of probing may be continually increased during the probing time period, to identify the available bandwidth limit along the path. In some embodiments, the probing rate may be adjusted based on the path conditions monitored in step 720. For example, if network congestion is detected along the path while probing during a given time period, the probing rate may be decreased accordingly.

At step 730, results of the probing period are collected and analyzed, as detailed above. For example, information regarding the path's conditions may be gather during the probing period (e.g., the amount of jitter and delays present along the path during probing), which may be used to determine when the available bandwidth limit along the path was reached. In other words, a change in the characteristics of the path at a certain point in time may indicate when the bandwidth limit was reached (e.g., when delays along the path suddenly increased, etc.). The value of the bandwidth limit may then be determined by referencing this point in time with the corresponding information for the sent probes (e.g., the rate and size of the probe packets that were sent when the available bandwidth limit was reached). In some implementations, probing may be performed any number of times along the path and an available bandwidth limit may be estimated based on the results (e.g., by averaging the results from different probing windows). Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the probing of available bandwidth through the core of a provider's network without introducing any routing changes to existing network traffic. Such an approach allows the available bandwidth limit along a path to be determined or estimated, without impacting the user traffic. In particular, predicted traffic patterns may be used to time when probing should occur, so as not to interfere with sensitive user traffic. During probing, the rate at which probes are sent may also be adjusted dynamically based on monitored path conditions, allowing for adverse effects on user traffic to be quickly mitigated.

While there have been shown and described illustrative embodiments that provide for predictive network control to be used in multicarrier WANs, it is to be understood that various other adaptations and modifications may be made within the spirit and scope of the embodiments herein. For example, the predictive networking techniques described herein may be adapted for use in other forms of networks, such as the IoT. In addition, the embodiments have been shown and described herein with relation to specific protocols and naming conventions for purposes of illustration. However, the embodiments in their broader sense are not as limited, and may, in fact, be used with other types of suitable protocols and/or naming conventions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   using, by a device located between a first network and a second network, a machine learning model to predict user traffic along a plurality of paths in the second network;
   identifying, by the device, a time period in which probe packets are to be sent along one or more of the plurality of paths in the second network based on the predicted user traffic along a particular path, wherein the time period is identified by:
      predicting a time-sensitive window in which time-sensitive traffic will be sent, and
      selecting the time period in which to send the probe packets to avoid the time-sensitive window;
   sending, by the device, the probe packets during the identified time period along the particular path;
   monitoring, by the device, a plurality of conditions along the plurality of paths, wherein the plurality of conditions includes congestion at a given link or for a particular traffic class;
   dynamically adjusting, by the device, a rate at which the probe packets are sent during the time period based on the monitored conditions, wherein the rate is increased or decreased taking into account a level of congestion at the given link or for the particular traffic class; and
   determining, by the device, an available bandwidth limit along the particular path based on the probe packet results.

2. The method as in claim 1, wherein the monitored conditions indicate a presence of traffic congestion along the path.

3. The method as in claim 2, wherein the presence of traffic congestion is based on application response time metrics and jitter, delay and queue states at one or more devices along the path.

4. The method as in claim 2, wherein the traffic congestion is associated with the given link along the particular path.

5. The method as in claim 2, further comprising:
   adjusting a rate downward in response to determining that traffic congestion is present.

6. The method as in claim 1, wherein dynamically adjusting the rate comprises:
   continually adjusting a rate upward during the time period.

7. The method as in claim 1, wherein the machine learning model used to predict the user traffic along the particular path is based on one or more of: bandwidth usage data, application type data, traffic flow characteristics, or statistical measurements regarding the particular path.

8. The method as in claim 1, wherein identifying the time period comprises:
   analyzing a traffic volume profile associated with a particular application type.

9. An apparatus, comprising:
   one or more network interfaces to communicate with an first network and an second network;
   a processor coupled to the network interfaces and adapted to execute one or more processes; and
   a memory configured to store a process executable by the processor, the process when executed operable to:
      use a machine learning model to predict user traffic along a plurality of paths in the second network;

identify a time period in which probe packets are to be sent along one or more of the plurality of paths in the second network based on the predicted user traffic along a particular path, wherein the time period is identified by:
  predicting a time-sensitive window in which time-sensitive traffic will be sent, and
  selecting the time period in which to send the probe packets to avoid the time-sensitive window;
send the probe packets during the identified time period along the particular path;
monitor a plurality of conditions along the plurality of paths, wherein the plurality of conditions includes congestion at a given link or for a particular traffic class;
dynamically adjust a rate at which the probe packets are sent during the time period based on the monitored conditions, wherein the rate is increased or decreased taking into account a level of congestion at the given link or for the particular traffic class; and
determine an available bandwidth limit along the particular path based on the probe packet results.

10. The apparatus as in claim 9, wherein the monitored conditions indicate the presence of traffic congestion along the particular path.

11. The apparatus as in claim 10, wherein the presence of traffic congestion is based on application response time metrics and jitter, delay and queue states at one or more devices along the particular path.

12. The apparatus as in claim 10, wherein the traffic congestion is associated with the given link along the particular path.

13. The apparatus as in claim 10, wherein the process when executed is further operable to:
  adjust a rate downward in response to determining that traffic congestion is present.

14. The apparatus as in claim 10, wherein the process when executed is further operable to:
  continually adjust a rate upward during the time period.

15. The apparatus as in claim 9, wherein the machine learning model used to predict the user traffic along the path is based on one or more of: bandwidth usage data, application type data, traffic flow characteristics, or statistical measurements regarding the particular path.

16. The apparatus as in claim 9, wherein the time period is identified by:
  analyzing a traffic volume profile associated with a particular application type.

17. A tangible, non-transitory, computer-readable media having software encoded thereon, the software when executed by a processor of an edge device located between a first network and second network operable to:
  use a machine learning model to predict user traffic along a plurality of paths in the second network;
  identify a time period in which probe packets are to be sent along one or more of the plurality of paths in the second network based on the predicted user traffic along a particular path, wherein the time period is identified by:
    predicting a time-sensitive window in which time-sensitive traffic will be sent, and
    selecting the time period in which to send the probe packets to avoid the time-sensitive window;
  send the probe packets during the identified time period along the particular path;
  monitor a plurality of conditions along the plurality of paths, wherein the plurality of conditions includes congestion at a given link or for a particular traffic class;
  dynamically adjust a rate at which the probe packets are sent during the time period based on the monitored conditions, wherein the rate is increased or decreased taking into account a level of congestion at the given link or for the particular traffic class; and
  determine an available bandwidth limit along the particular path based on the probe packet results.

* * * * *